United States Patent Office 3,763,059
Patented Oct. 2, 1973

3,763,059
POLYMER PARTICULATING PROCESS
Donald G. Needham and Luther O. Myers, Jr., Bartlesville, Okla., assignors to Phillips Petroleum Company
No Drawing. Continuation-in-part of abandoned application Ser. No. 29,633, Apr. 17, 1970. This application Mar. 27, 1972, Ser. No. 238,535
Int. Cl. C08f 29/04, 29/06, 47/10
U.S. Cl. 260—2.5 B                                          17 Claims

ABSTRACT OF THE DISCLOSURE

A process for particulating a polymer material by adding specific volumes of specific particulating materials such as stearic acid, oleylamide, erucylamide, and mixtures thereof to a fluxed mass of the polymer and blending said polymer and particulating material for less than about a specific time limit.

---

This application is a continuation-in-part of copending application Ser. No. 29,633, filed Apr. 17, 1970, now abandoned.

This invention resides in a process for particulating a volume of polymer. In another aspect, this invention resides in a process for granulating and powdering a mass of melt blended material comprising at least one polymer.

In the manufacture of articles from polymers, it is often necessary to have a volume of powdered and/or granulated polymer. One example for such powdered and/or granulated polymer is when said polymer is to be used as a carrier material for a blowing agent to form a blowing agent concentrate. The blowing agent concentrate is metered and delivered into an extruder with the same or other polymer for forming foamed polymer, for example.

Heretofore utilized methods for forming granulated and/or powdered polymers have been by solution and precipitation processes, spray drying, grinding, and others, for example. When using concentrates, it heretofore has been found advantageous to form the concentrate into pellets thereby simplifying the metering and injection of said concentrate into an extruder, for example.

In order to decrease the number of steps and/or time, labor, and equipment necessary to prepare polymer for use in forming a blowing agent concentrate or providing granulated and/or powdered polymer, it has been discovered that specific polymers or blends thereof when fluxed and when blended with specific particulating materials or blends thereof in a specific ratio range causes the polymer materials to particulate. The term "particulating" used herein means the separating, powdering, and granulating of flowable, blended polymer or polymer mixtures into separate, generally nonadhering, individual, relatively small size particles.

It is therefore an object of this invention to provide a process for particulating a polymer and blends of polymers. Another object of this invention is to provide a process for forming granules from a flowable mass of polymer and polymer mixtures. Yet another object of this invention is to provide a process for forming powder from a flowable mass of polymer and polymer mixtures.

Other aspects, objects, and advantages of the present invention will become apparent from a study of the disclosure and appended claims.

In the process of this invention, a volume of polymeric material such as polyethylene, copolymers of ethylene, polypropylene, ethylene vinyl acetate copolymer, polyisobutylene, or a mixture thereof, is fluxed thereby forming a flowable mass of a polymer material. The copolymers of ethylene can be, for example, ethylene and 1-olefins having from 3–8 carbon atoms per molecule. Thereafter, a volume of particulating material is blended into the fluxed material. This particulating material is, for example, stearic acid, stearamide, erucamide, or a mixture thereof, and is blended with the fluxed polymer material in a range of about 2–10 weight percent for a period less than that period which fluxes said polymer and particulating material.

It has been found that if a volume of particulating material greater than 10 percent is added to these polymer materials or mixtures thereof, the resultant blend will tend to lose some of the valuable properties of the polymer such as stiffness, tensile strength and the particulating material will bleed and coat the walls of the processing equipment which in turn leads to degradation and contamination of the material being processed and if less than 2 percent particulating agent is utilized, these polymer materials or mixtures thereof will not be completely particulated, granulated or powdered, thereby resulting in waste. Further, it has been found that if the polymer and particulating material are blended together for a period of time sufficient to flux said polymer and particulating material that the resultant material will not be particulated, granulated or powdered.

One of the polymer materials that is most often desired in a granulated or powdered form is low density polyethylene. When low density polyethylene is utilized as substantially the polymer material to be particulated, then it has been that a volume of stearic acid in the preferred range of about 3–7 weight percent satisfactorily particulates the polymer without utilizing an excessive amount of said particulating material. Where additives, such as dyes, blowing agents, stabilizers, fillers, and the like are desired to be incorporated into the resultant particulating material, it has been found that these blowing agents, dyes and other additives can be added to and fluxed with the polymer material.

Following are examples of various base polymer materials and the particulating material utilized in the process of this invention. In all examples, the polymer was fluxed in a Banbury type mixer, the desired quantity of additives was added to the fluxed material and about 1 minute before dumping, the particulating agent was added. Mixing continued for one minute and a particulate product was recovered.

EXAMPLE NO. 1

Polymer material—low density polyethylene:
    (a) Density—0.925 gm./cc.
    (b) Melt index—2.5
Particulating material—stearic acid:
    (a) Weight percent—6
Additives—sodium bicarbonate and 4,4'-oxybis(benzenesulfonylhydrazide):
    (a) Weight percent—15 and 1.5 respectively
Results—white powder 10–20 weight percent of sodium bicarbonate and/or 1–2 weight percent of 4,4'-oxybis(benzenesulfonylhydrazide) can be utilized but amounts greater than about 20 weight percent and 2 weight percent, respectively, would produce a concentrate with excessive blowing agent per total material volume.

EXAMPLE NO. 2

Polymer material—low density polyethylene:
    (a) Density—0.925 gm./cc.
    (b) Melt index—2.5
Particulating material—stearic acid:
    (a) Weight percent—3
Additives—sodium bicarbonate and 4,4'-oxybis(benzenesulfonylhydrazide):
    (a) Weight percent—15 and 1.5 respectively
Results—white, relatively coarse powder

EXAMPLE NO. 3

Polymer material—polyethylene:
   (a) Density—.96 gm./cc.
   (b) Melt index—0.2
Particulating material—stearic acid:
   (a) Weight percent—6
Additives:
   (a) Weight percent—none
Results—coarse particles

EXAMPLE NO. 4

Polymer material—polyethylene:
   (a) Density—.950 gm./cc.
   (b) Melt index—9.5
Particulating material—stearic acid:
   (a) Weight percent—6
Additives:
   (a) Weight percent—none
Results—small particles

EXAMPLE NO. 5

Polymer material—polypropylene:
   (a) Density—.92 gm./cc.
   (b) Melt flow—4.5.
Particulating material—stearic acid:
   (a) Weight percent—6
Additives:
   (a) Weight percent—none
Resulting—coarse particles

EXAMPLE NO. 6

Polymer material—polyethylene:
   (a) Density—.925 gm./cc.
   (b) Melt index—2.5
Particulating material—stearic acid:
   (a) Weight percent—3
Additives:
   (a) Weight percent—none
Results—fine powder

EXAMPLE NO. 7

Polymer material—polyethylene:
   (a) Density—.925 gm./cc.
   (b) Melt index—2.5
Particulating material—erucylamide:
   (a) Weight percent—6
Additives—sodium bicarbonate and 4,4'-oxybis(benzenesulfonylhydrazide):
   (a) Weight percent—15 and 1.5 respectively
Results—fine powder

EXAMPLE NO. 8

Polymer material—polyethylene:
   (a) Density—.925 gm./cc.
   (b) Melt index—2.5
Particulating material—oleamide:
   (a) Weight percent—6
Additives—sodium bicarbonate and 4,4'-oxybis(benzenesulfonylhydrazide):
   (a) Weight percent—15 and 1.5 respectively
Results—powder It has been found that the particular materials used, the speed of the blending apparatus, and the construction of the blending apparatus affect the time during which the polymer and particulating material should be blended. Once these variables have been established by choosing the materials to be used and the blending apparatus, the preferred blending time for producing the particulate can be easily determined.

Other modifications and alterations of this invention will become apparent to those skilled in the art from the foregoing discussion and examples and it should be understood that this invention is not to be unduly limited thereto.

What is claimed is:

1. A process for particulating polymer materials, comprising:
fluxing at least one polymer selected from the group consisting of polyethylene, copolymers of ethylene, polypropylene, ethylene-vinyl acetate copolymer, and polyisobutylene;
blending particulating material with said polymer material, said particulating material being at least one material selected from a group consisting of stearic acid, oleylamide and erucylamide, said particulating material being in the range of about 2–10 weight percent, and said polymer and particulating material being blended together only for a period less than that period which fluxes said polymer and particulating material; and
recovering resulting particulate polymer material.

2. A process, as set forth in claim 1, wherein the polymer material is low density polyethylene, the particulating material is stearic acid, and said stearic acid has a value in the range of 3–7 weight percent.

3. A process, as set forth in claim 2, wherein the low density polyethylene has a melt index of about 2.5 and a density of about 0.92 gm./cc.

4. A process, as set forth in claim 1, further including adding to and fluxing additive materials with the polymer material.

5. A process, as set forth in claim 4, wherein the additive material comprises at least one blowing agent.

6. A process, as set forth in claim 4, wherein the additive material comprises a dye.

7. A process, as set forth in claim 1, wherein the polymer material is polypropylene having a melt flow of about 4.5 and a density of about .92 gm./cc.

8. A process, as set forth in claim 1, wherein the polymer material is polyethylene having a density of about .96 gm./cc. and a melt index of about 0.2.

9. A process, as set forth in claim 1, wherein the polymer material is polyethylene having a density of about .95 gm./cc. and a melt index of about 9.5.

10. A process, as set forth in claim 1, wherein the polymer material is a copolymer of ethylene and 1-olefins having from 3–8 carbon atoms.

11. A process, as set forth in claim 1, wherein the polymer and particulating agent were blended together for a period of less than one minute.

12. A process for particulating polymer material, comprising:
fluxing at least one polymer selected from the group consisting of polyethylene, copolymers of ethylene, polypropylene, ethylene-vinyl acetate copolymer, polyisobutylene;
blending particulating material with said polymer material, said particulating material being at least one material selected from the group consisting of stearic acid, oleylamide and erucylamide, said particulating material being in the range of about 2–10 weight percent, said polymer and particulating material being blended together only for a period less than that period which fluxes said polymer and particulating material, said period being less than one minute; and
recovering resulting particulate polymer material.

13. A process, as set forth in claim 12, wherein the polymer is polyethylene having a density in the range of .920 to .96.

14. A process, as set forth in claim 13, further including adding to and fluxing additive materials with the polymer material.

15. A process, as set forth in claim 13, wherein the additive material comprises at least one blowing agent.

16. A process, as set forth in claim 13, wherein the additive material comprises a dye.

17. A process, as set forth in claim 14, wherein the additive material comprises at least one blowing agent and a dye.

References Cited

UNITED STATES PATENTS

| | | | |
|---|---|---|---|
| 3,231,530 | 1/1966 | Prahl | 260—23 H |
| 3,472,801 | 10/1969 | Lerman et al. | 260—2.5 B |
| 2,927,904 | 3/1960 | Cooper | 260—2.5 HA |

FOREIGN PATENTS

| | | | |
|---|---|---|---|
| 572,695 | 1/1941 | Great Britain | 260—94.9 GD |

JOHN C. BLEUTGE, Primary Examiner
W. J. BRIGGS, SR., Assistant Examiner

U.S. Cl. X.R.

260—2.5 HA, 2.5 E, 23 H, 31.2 R, 32.6 PQ, 88.1 R, 87.3, 93.7, 94.8, 94.9 F, 94.9 GD